United States Patent
Nakanishi et al.

(10) Patent No.: US 10,310,427 B2
(45) Date of Patent: Jun. 4, 2019

(54) IMAGE FORMING APPARATUS THAT DISPLAYS GUIDANCE VIDEO

(71) Applicant: Kyocera Document Solutions Inc., Osaka (JP)

(72) Inventors: Shinichi Nakanishi, Osaka (JP); Michiko Tashiro, Osaka (JP); Emi Tennichi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/825,288

(22) Filed: Nov. 29, 2017

(65) Prior Publication Data

US 2018/0181041 A1 Jun. 28, 2018

(30) Foreign Application Priority Data

Dec. 28, 2016 (JP) .................................. 2016-256862

(51) Int. Cl.
*G03G 15/00* (2006.01)
*H04N 1/00* (2006.01)

(52) U.S. Cl.
CPC ....... *G03G 15/502* (2013.01); *G03G 15/5012* (2013.01); *G03G 15/70* (2013.01); *H04N 1/00408* (2013.01); *H04N 2201/3273* (2013.01)

(58) Field of Classification Search
CPC .. G03G 15/502; G03G 15/70; G03G 15/5012; H04N 1/00408; H04N 2201/3273
See application file for complete search history.

(56) References Cited

U.S. PATENT DOCUMENTS

| 2007/0201884 | A1* | 8/2007 | Yamada | G03G 15/70 399/21 |
| 2013/0135646 | A1* | 5/2013 | Akiyama | G06F 3/12 358/1.13 |
| 2014/0146342 | A1* | 5/2014 | Ishii | G06K 15/4085 358/1.14 |
| 2015/0168906 | A1* | 6/2015 | Ishii | G03G 15/70 399/21 |

FOREIGN PATENT DOCUMENTS

| JP | H10-107940 A | 4/1998 |
| JP | H10-297795 A | 11/1998 |

* cited by examiner

*Primary Examiner* — Joseph S Wong
(74) *Attorney, Agent, or Firm* — HEA Law PLLC

(57) ABSTRACT

An image forming apparatus includes a display, a display controller, a cover, a cover sensor, a recording sheet sensor, and a jam solution work progress managing unit. The display controller causes the display to continuously display a guidance video in a process sequence when the recording sheet jam occurs. The guidance video shows a work procedure constituted of a plurality of processes for a solution work for a recording sheet jam. The jam solution work progress managing unit manages a progress of the solution work for the recording sheet jam. When the jam solution work progress managing unit determines that the solution work for the recording sheet jam is not performed while the cover sensor detects closing of the cover, the display controller causes the display to repeatedly display a guidance video showing a work procedure for a first process in the solution work for the recording sheet jam.

8 Claims, 8 Drawing Sheets

IMAGE FORMING APPARATUS THAT DISPLAYS GUIDANCE VIDEO

INCORPORATION BY REFERENCE

This application is based upon, and claims the benefit of priority from, corresponding Japanese Patent Application No. 2016-256862 filed in the Japan Patent Office on Dec. 28, 2016, the entire contents of which are incorporated herein by reference.

BACKGROUND

Unless otherwise indicated herein, the description in this section is not prior art to the claims in this application and is not admitted to be prior art by inclusion in this section.

There has been provided a typical image forming apparatus such as a printer and a multi-functional peripheral that has a function to display a guidance video showing a solution work for a recording sheet jam in a display when the recording sheet jam occurs. With the image forming apparatus, even an operator unaccustomed to a machine operation can perform the work while viewing the guidance video to solve the recording sheet jam.

There has been proposed an image forming apparatus that displays a guidance video of a motionless image in a screen by pressing a help key and displays the previous guidance video or the next guidance video by pressing "PRE" or "NEXT" in the screen. There has also been proposed an image forming apparatus that displays a position of a remaining recording sheet in different display styles such as lighting or flashing the position of the remaining recording sheet or changing the display color according to the number of times that a recording sheet is forgotten to be taken in the past at respective remaining positions when a jam state is set by a recording sheet jam.

SUMMARY

An image forming apparatus according to one aspect of the disclosure includes a display, a display controller, a cover, a cover sensor, a recording sheet sensor, and a jam solution work progress managing unit. The display controller causes the display to continuously display a guidance video in a process sequence when the recording sheet jam occurs. The guidance video shows a work procedure constituted of a plurality of processes for a solution work for a recording sheet jam. The cover is openable during the solution work for the recording sheet jam. The cover sensor detects an open/close state of the cover. The recording sheet sensor is located in a middle of a conveyance path for recording sheet. The recording sheet sensor detects a conveyance situation of the recording sheet. The jam solution work progress managing unit manages a progress of the solution work for the recording sheet jam based on a detection result by the recording sheet sensor. When the jam solution work progress managing unit determines that the solution work for the recording sheet jam is not performed while the cover sensor detects a closing of the cover, the display controller causes the display to repeatedly display a guidance video showing a work procedure for a first process in the solution work for the recording sheet jam.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
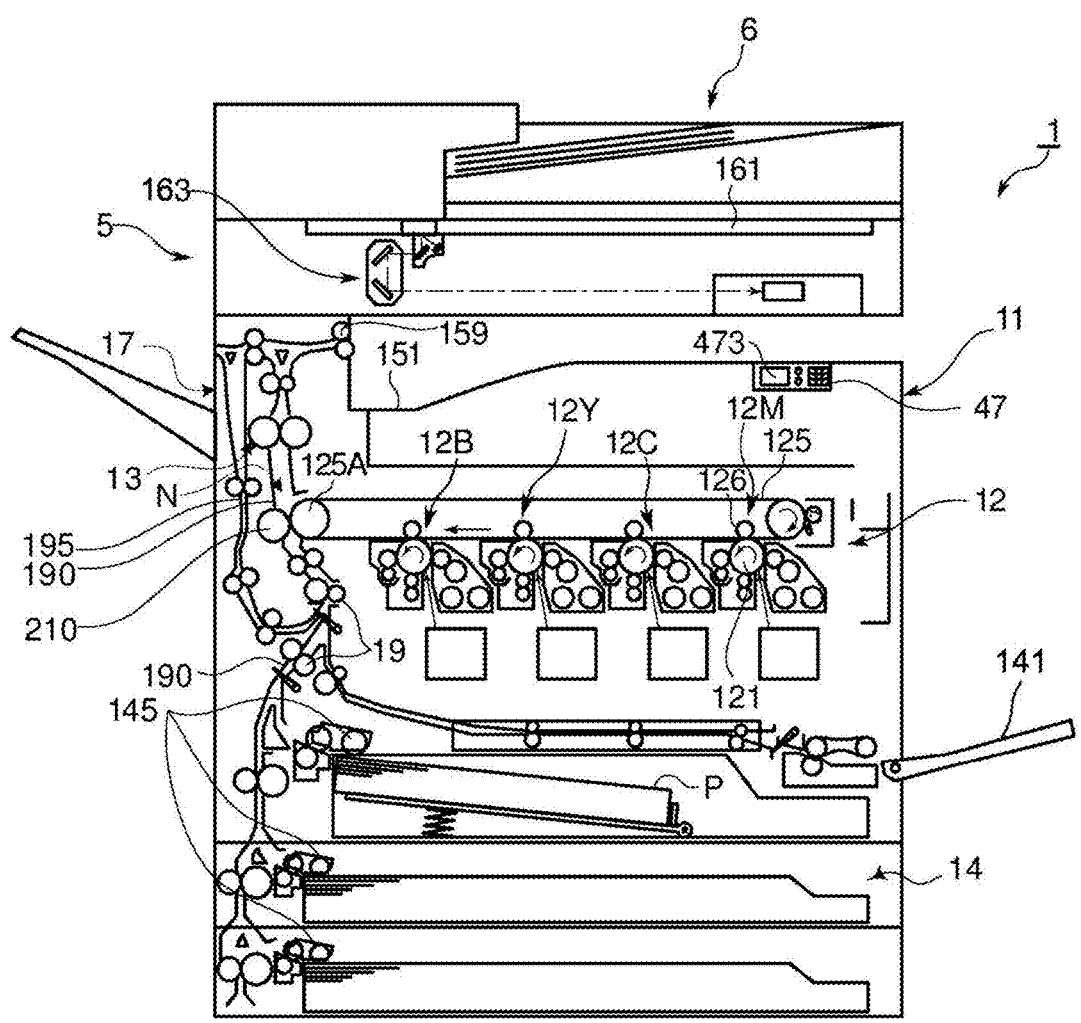
FIG. 1 illustrates a structure of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image forming apparatus according to one embodiment of the disclosure with reference to the accompanying drawings. FIG. 1 illustrates a structure of the image forming apparatus according to the one embodiment of the disclosure.

An image forming apparatus 1 according to the one embodiment of the disclosure is a multi-functional peripheral having a plurality of functions such as a copy function, a printer function, a scanner function, and a facsimile function. The image forming apparatus 1 is constituted of an apparatus main body 11 including an operation unit 47, an image forming unit 12, a fixing unit 13, a paper sheet feeder 14, a document feeding unit 6, a document reading unit 5, and similar unit.

The operation unit 47 accepts instructions on various kinds of operations and processes that can be executed by the image forming apparatus 1 such as an image forming operation execution instruction and a document reading operation execution instruction from an operator. The operation unit 47 includes a display 473 that displays a guidance video or a similar video showing an operation guide for the operator and a maintenance work such as a solution work for a recording sheet jam. The display 473 includes a touch panel, and the operator touches a key displayed in the screen, thus ensuring the operation of the image forming apparatus 1.

When the image forming apparatus 1 performs a document reading operation, the following processes are performed. The document reading unit 5 optically reads a document fed by the document feeding unit 6 or an image of a document placed on a document placing glass 161, and thus image data is generated. The image data generated by the document reading unit 5 is stored in a built-in HDD, a network-connected computer, or a similar medium.

When the image forming apparatus 1 performs an image forming operation, the following processes are performed. The image forming unit 12 forms a toner image on a recording sheet P as a recording medium fed from the paper sheet feeder 14, based on the image data generated by the document reading operation, the image data received from the network-connected computer, the image data stored in the built-in HDD, or similar data. In a color printing, the following processes are performed. An image formation unit 12M for magenta, an image formation unit 12C for cyan, an image formation unit 12Y for yellow, and an image formation unit 12B for black of the image forming unit 12 each forms the toner image on a photoreceptor drum 121 through processes of electrostatic charge, exposure, and development based on images formed of the respective color components constituting the image data. These toner images are transferred on an intermediate transfer belt 125 by a primary transfer roller 126.

The toner images with the respective colors, which are transferred on the intermediate transfer belt 125, are superimposed on the intermediate transfer belt 125 with transfer timing adjusted, becoming a color toner image. A secondary transfer roller 210 causes this color toner image formed on the surface of the intermediate transfer belt 125 to transfer on the recording sheet P conveyed from the paper sheet feeder 14 through a conveyance path 190 at a nip portion N sandwiching the intermediate transfer belt 125 with a drive roller 125A. Thereafter, the fixing unit 13 causes the toner image on the recording sheet P to be fixed on the recording sheet P by thermocompression bonding. The color-image-formed recording sheet P to which the fixing process has completed is discharged to a discharge tray 151.

The paper sheet feeder 14 includes a manual bypass tray 141 and a plurality of sheet feed cassettes. When the operator specifies a size of the recording sheet, pickup rollers 145 at the sheet feed cassettes housing the recording sheet with this size rotatably drives and feeds the recording sheets P housed in the respective sheet feed cassettes to the nip portion N.

For duplex printing, the image forming apparatus 1 performs the following processes. The image forming apparatus 1 sets the recording sheet P on which the image forming unit 12 forms the image on one surface in a state nipped by a discharge roller pair 159. Then, the image forming apparatus 1 reversely feeds this recording sheet P with the discharge roller pair 159 to send the recording sheet P to an inverting conveyance path 195. The image forming apparatus 1 reconveys the recording sheet P with a conveyance roller pair 19 in the upper stream of a conveyance direction of the recording sheet P with respect to the nip portion N and the fixing unit 13. As a result, the image is formed on the other surface of this recording sheet P by the image forming unit 12.

The apparatus main body 11 includes openable/closable covers, levers, and similar components at respective sites. For example, the apparatus main body 11 includes a left cover 17 on the left side surface and a front cover (not illustrated) on the front surface. The operator operates the cover and the lever of the apparatus main body 11 for the maintenance work of the image forming apparatus 1. For example, in case of the recording sheet jam, the operator opens the left cover 17 and the front cover of the apparatus main body 11 to view the inside of the apparatus main body 11 for removal of a slip of paper stuck at the conveyance path 190, the fixing unit 13, or a similar member.

The apparatus main body 11 includes cover sensors (see FIG. 2) that detect the open/close state at the respective covers. For example, the cover sensor located at the left cover 17 detects the open/close state of the left cover 17. The sheet feed cassettes in the paper sheet feeder 14 and the conveyance paths 190 and 195 include recording sheet sensors (see FIG. 2) that detect the conveyance condition of the recording sheet.

Figure 2:
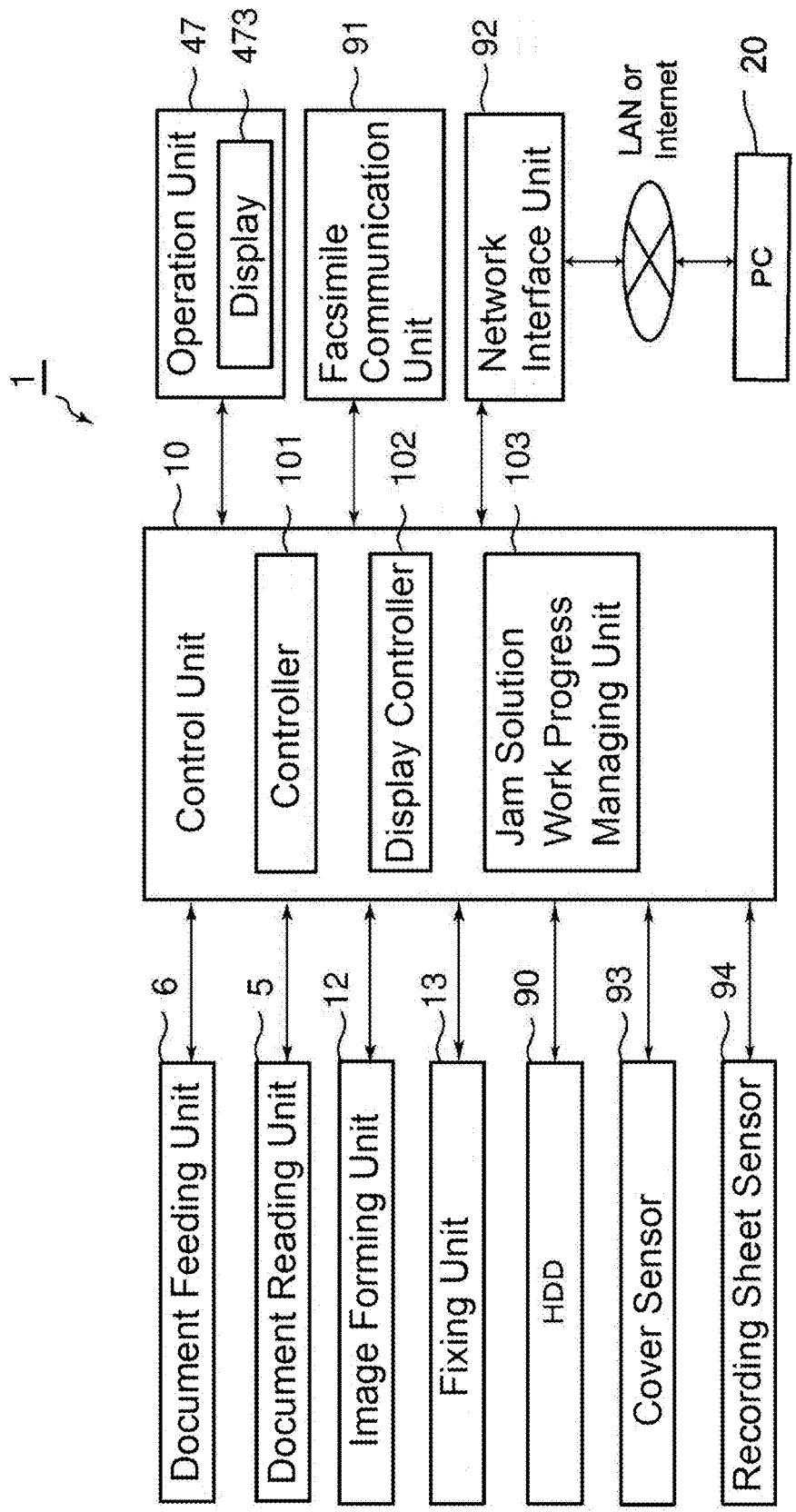
FIG. 2 illustrates a function block diagram illustrating an internal configuration of the image forming apparatus according to the one embodiment.

The following describes an electrical configuration of the image forming apparatus 1. FIG. 2 illustrates a function block diagram illustrating an internal configuration of the image forming apparatus 1.

The image forming apparatus 1 includes a control unit 10, the operation unit 47, the document feeding unit 6, the document reading unit 5, the image forming unit 12, the fixing unit 13, a HDD 90, a facsimile communication unit 91, a network interface unit 92, a cover sensor 93, a recording sheet sensor 94, and a similar member.

The document reading unit 5, under control by the control unit 10, includes a reading mechanism 163 (see FIG. 1) with a light irradiation unit, a CCD sensor, and a similar component. The document reading unit 5 irradiates a document by the light irradiation unit and reads the image from the document by receiving reflected light with the CCD sensor.

The operation unit 47, as also illustrated in FIG. 1 in addition to FIG. 2, accepts the instructions on the various kinds of operations and processes that can be executed by the image forming apparatus 1 from the operator. The operation unit 47 includes the (touch panel type) display 473 with a touch panel function. The display 473 is equivalent to the display described in the claims.

The HDD 90 is a large capacity storage device storing the document images read by the document reading unit 5 or similar data.

The facsimile communication unit 91 includes a modulation/demodulation unit, a modulation and demodulation unit, and a (not illustrated) network control unit (NCU) and performs facsimile transmission with the use of dial-up line network.

The network interface unit 92 is constituted of a communication module such as a LAN board. The network interface unit 92 performs transmission and reception of various data with, for example, a personal computer 20 inside a local area network or on the Internet via LAN or a similar network connected to this network interface unit 92.

The cover sensor 93 is located at, for example, the left cover 17 of the apparatus main body 11 to detect the open/close state of the respective covers. The cover sensor 93 may be any of mechanical, optical, and magnetic cover sensors, which turn on/off in association with the open and the close of the covers.

The recording sheet sensors 94 are located at respective sites on a conveyance path for the recording sheet to detect the feed condition of the recording sheet. The recording sheet sensor 94 may be any of mechanical, optical, and magnetic recording sheet sensors. The mechanical recording sheet sensor is constituted of, for example, a photo interrupter (not illustrated) and a recording sheet detection actuator (not illustrated), which cuts off and releases the cutoff of an optical axis of this photo interrupter. When the recording sheet P is in contact with the recording sheet detection actuator, the recording sheet detection actuator cuts off the optical axis of the photo interrupter and detects the presence of the recording sheet. Meanwhile, the optical recording sheet sensor is, for example, constituted of a light-emitting element and a light receiving portion, which receives light from this light-emitting element, arranged at a position opposed to this light-emitting element via the conveyance path 190. When the recording sheet P is absent at the conveyance path 190, the light receiving portion receives the light from the light-emitting element to detect the absence of the recording sheet. When the recording sheet P is present at the conveyance path 190, since this recording sheet cuts off the light from the light-emitting element, the light receiving portion does not receive the light. A controller 101 and a jam solution work progress managing unit 103 described later detect the present of the recording sheet or the absence of the recording sheet based on a detection signal indicating these received/non-received lights output from the recording sheet sensor 94.

The control unit 10 is constituted of, for example, a processing unit, a RAM, a ROM, and a dedicated hardware circuit. The processing unit is, for example, a CPU, an MPU, an ASIC, or a similar electronic component. The control unit 10 includes the controller 101, a display controller 102, and the jam solution work progress managing unit 103. The operation of the processing unit in accordance with a control program stored in, for example, the HDD 90 causes the control unit 10 to function as the controller 101, the display controller 102, and the jam solution work progress managing unit 103.

The controller 101 manages the entire operation control of the image forming apparatus 1. The controller 101 is connected to, for example, the document reading unit 5, the document feeding unit 6, the image forming unit 12, the fixing unit 13, the operation unit 47, the HDD 90, the facsimile communication unit 91, the network interface unit 92, the cover sensor 93, and the recording sheet sensor 94. The controller 101 controls the connected respective mechanisms and transmits and receives signals or data with the respective mechanisms.

The controller 101 controls driving and processes of respective mechanism units necessary to control the respective functions of a scanner function, a copy function, and a printer function in accordance with an execution instruction of the job accepted through the operation unit 47 or similar unit from the operator. In particular, the controller 101 controls the display of the display 473. The touch panel function of the display 473 accepts a touch operation of the operator to the display 473.

When the display controller 102 determines the necessity of the solution work for the recording sheet jam, the display controller 102 causes the display 473 to display the guidance video showing a work procedure for respective processes in the solution work for the recording sheet jam. That is, the display controller 102 is in charge of the control regarding the behavior to display the guidance video among the display behavior by the display 473.

The data of the guidance video, for example, is saved in a non-volatile memory (not illustrated) in the control unit 10 or a storage region in the HDD 90. The display controller 102 reads the data of the appropriate guidance video from this storage region for display in the display 473. The guidance video is constituted of videos of the respective processes in the solution work for the recording sheet jam. The display controller 102 causes the guidance videos for the respective processes to be continuously displayed in order from the first process. The guidance video may be an animation and an animated film or may be one that continuously displays motionless images.

Figure 3:
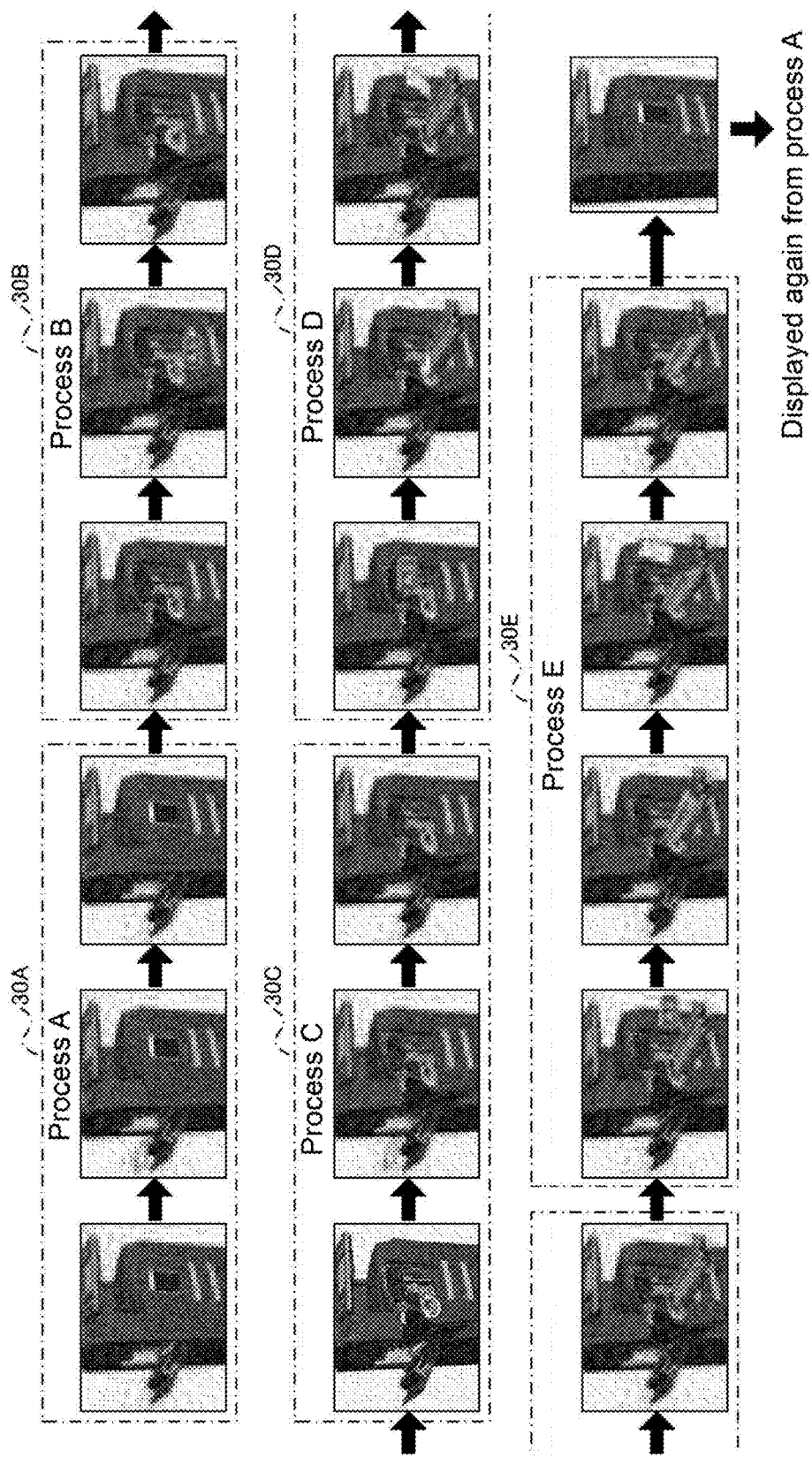
FIG. 3 illustrates an exemplary configuration of guidance videos showing a solution work for a recording sheet jam.

FIG. 3 illustrates an exemplary configuration of the guidance videos showing the solution work for the recording sheet jam. For example, the solution work for the recording sheet jam is constituted of five processes A to E.

The first process A is a work process inside the left side of the main body. A guidance video 30A for the process A is constituted of a series of videos showing a work to open the left cover 17 of the apparatus main body 11 and remove the recording sheet stuck at the proximity of the fixing unit 13.

The subsequent process B is the work process to remove the recording sheet stuck at the nip portion N of the drive roller 125A with the secondary transfer roller 210. A guidance video 30B for the process B is constituted of a series of videos showing a work to open the front cover of the apparatus main body 11, turn a knob, and remove the paper sheet stuck at the nip portion N.

The subsequent process C is a work process to remove the recording sheet stuck at the inverting conveyance path 195. A guidance video 30C for the process C is constituted of a series of videos showing a work to turn the knob in the opposite direction and send the recording sheet stuck at the inverting conveyance path 195 to the nip portion N for removal.

The subsequent process D is a work process to remove the recording sheet stuck in the middle of the conveyance from the paper feeding unit to the image forming unit 12. A guidance video 30D for the process D is constituted of a series of videos showing a work to pull out the paper feeding unit and remove the recording sheet.

The last process E is a process to remove the recording sheet stuck at the inside of the paper feeding unit. A guidance video 30E for the process E is constituted of a series of videos showing a work to open a conveyance cover of the paper feeding unit and remove the recording sheet stuck at the inside.

The display controller 102 causes the display 473 to display the guidance videos 30A to 30E in order when the recording sheet jam occurs.

Figure 4:
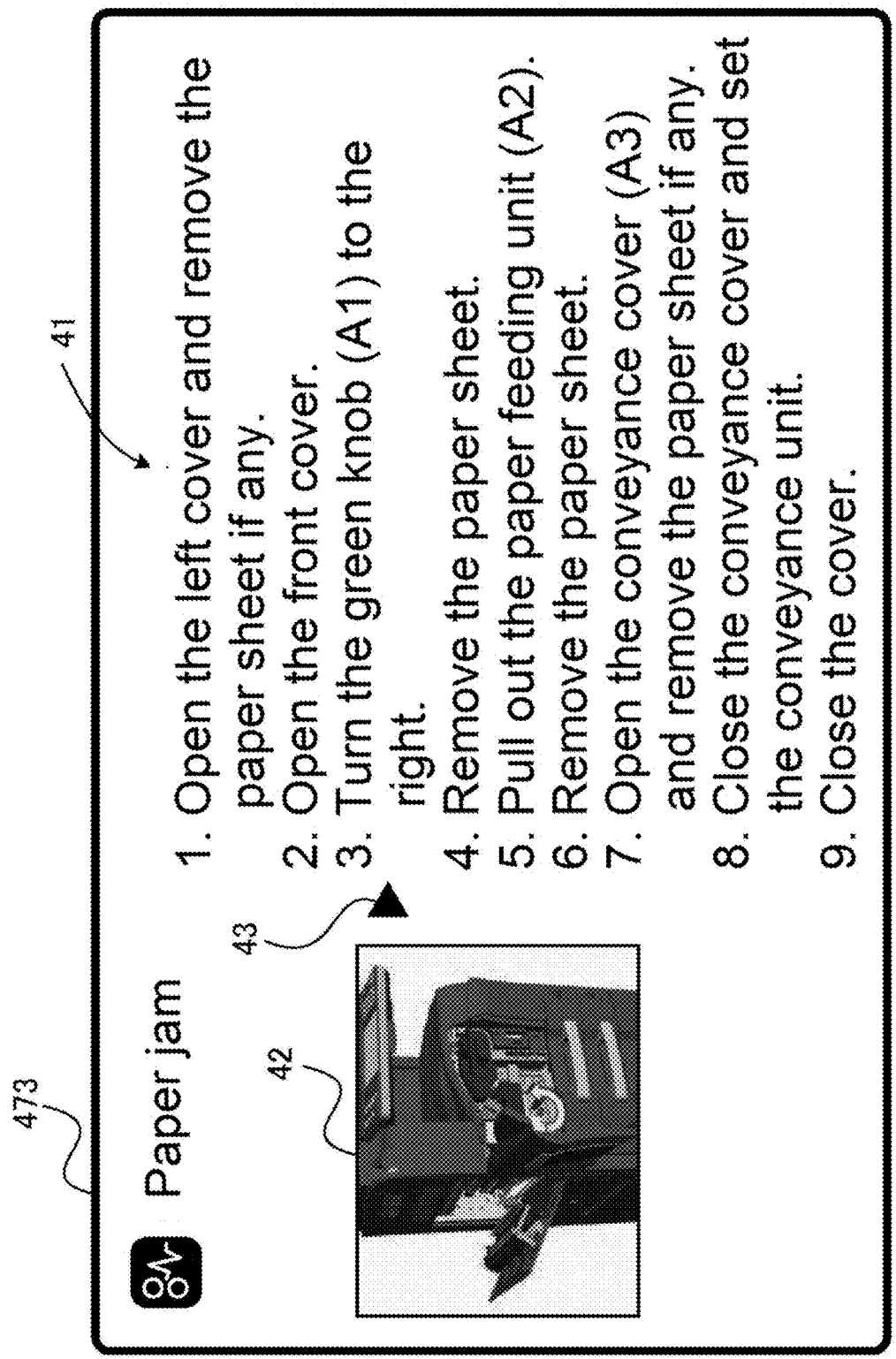
FIG. 4 illustrates a screen display example of the guidance video showing the solution work for the recording sheet jam.

FIG. 4 illustrates a screen display example of the guidance video showing the solution work for the recording sheet jam. For example, the display controller 102 causes the display 473 to display an explanation 41 for the flow of the solution work for the recording sheet jam on the right side of the display 473. The display controller 102 causes the display 473 to display a guidance video 42 (for example, the guidance videos 30A to 30E) in a video display area on the left side in the display 473. Further, the display controller 102 causes a cursor 43, which moves in accordance with the progress of the guidance video 42, to be displayed on the left side of the explanation 41. When the display controller 102 ends the display of the guidance video 30E for the last process E, the display controller 102 causes the display to return to the guidance video 30A to display the guidance video again from the beginning.

Now returning to FIG. 2, the jam solution work progress managing unit 103 manages the progress of the solution work for the recording sheet jam based on the detection result by the recording sheet sensors 94. As described above, the recording sheet sensors 94 are located at the respective sites at the conveyance path for the recording sheet. The jam solution work progress managing unit 103 can know the site where the recording sheet remains in the apparatus main body 11 based on whether the detection result has been received from any of the recording sheet sensors 94 at the conveyance path and the contents of the detection result. That is, the jam solution work progress managing unit 103 determines the presence of the recording sheet remaining in the apparatus main body 11 and the remaining site to manage the extent of the progress of the solution work for the recording sheet jam. For example, when the jam solution work progress managing unit 103 finds that the remaining recording sheet is absent in the apparatus main body 11 from the detection results by the recording sheet sensors 94, the jam solution work progress managing unit 103 determines that the solution work for the recording sheet jam has been completed. Meanwhile, when the jam solution work progress managing unit 103 finds that the recording sheet remains in the inverting conveyance path 195 from the detection results by the recording sheet sensors 94, the jam solution work progress managing unit 103 determines that that process C and after the process C have not been completed yet.

With the image forming apparatus 1 according to the embodiment, the display controller 102 causes the display 473 to display the appropriate guidance video according to the detection result by the cover sensor 93 and work progress determination by the jam solution work progress managing unit 103. The following describes the display process of the guidance video in the image forming apparatus 1.

Figure 5:
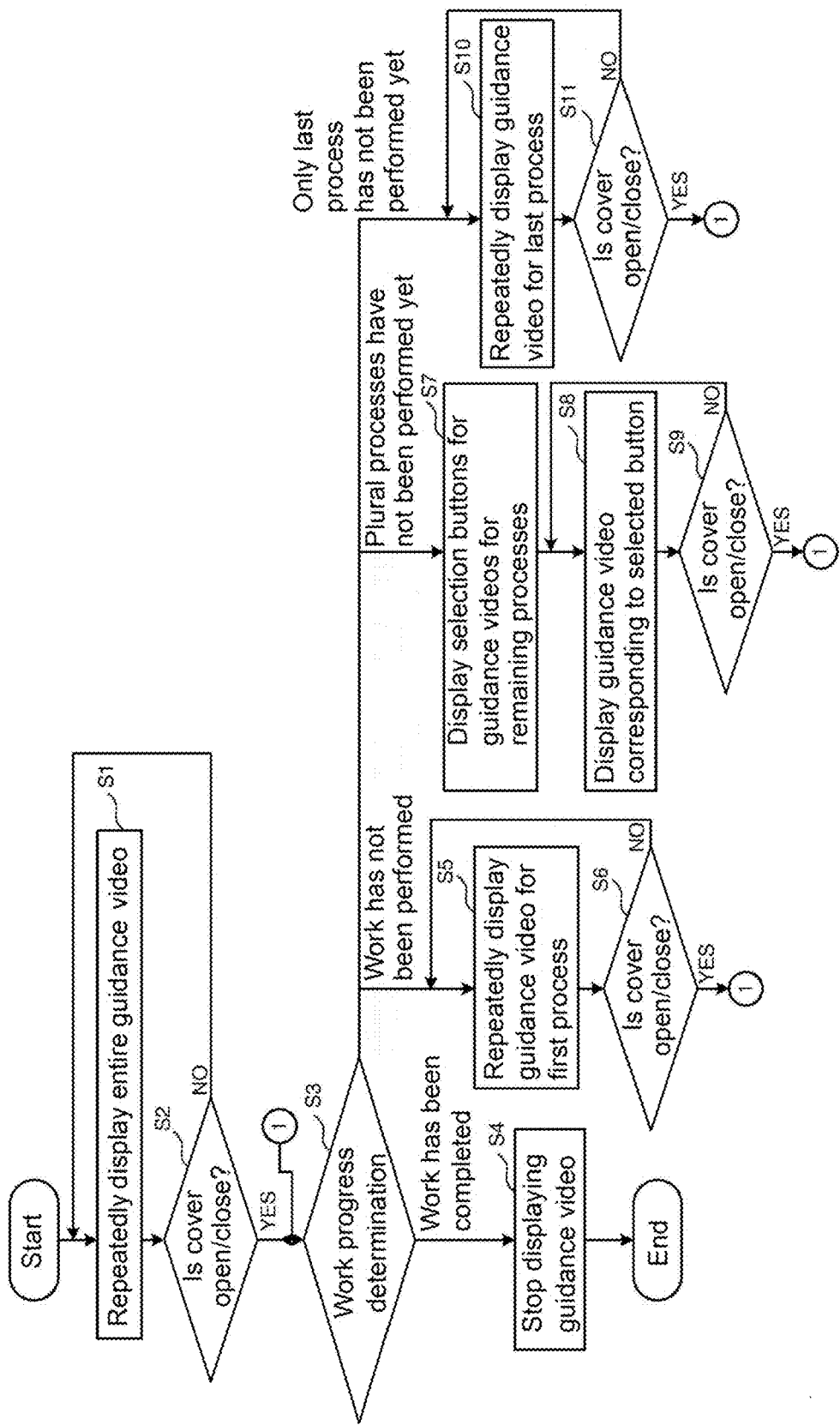
FIG. 5 illustrates a display process of the guidance video in the image forming apparatus according to the one embodiment.

FIG. 5 illustrates the display process for the guidance video in the image forming apparatus 1. When the recording sheet jam occurs, the display controller 102 causes the display 473 to repeatedly display the guidance videos showing the works for respective processes in the solution work for the recording sheet jam (for example, the guidance videos for the process A to the process E illustrated in FIG. 3) (Step S1). The display controller 102 causes the display 473 to repeatedly display the entire guidance video for the respective processes until the left cover 17 is once opened and thereafter the display controller 102 detects the closing of the left cover 17 based on the detection result by the cover sensor 93 (NO at Step S2).

When the display controller 102 detects the closing of the left cover 17 (YES at Step S2), the display controller 102 switches the display control of the guidance video according to the work progress determination by the jam solution work progress managing unit 103 (Step S3) as follows.

When the jam solution work progress managing unit 103 determines all completions of the jam solution work ("Work completed" at Step S3), the display controller 102 stops displaying the guidance video (Step S4).

When the jam solution work progress managing unit 103 determines that the jam solution work has not been performed at all ("Work not performed" at Step S3), the display controller 102 causes the guidance video showing the work procedure for the first process in the solution work for the recording sheet jam (for example, the guidance video for the process A illustrated in FIG. 3) to be displayed (Step S5). The display controller 102 causes the display 473 to repeatedly display this guidance video for the first process until the left cover 17 is once opened and thereafter the display controller 102 detects the closing of the left cover 17 based on the detection result by the cover sensor 93 (NO at Step S6). When the display controller 102 detects the closing of the left cover 17 (YES at Step S6), the process returns to Step S3 and the display controller 102 switches the display control of the guidance video according to the work progress determination by the jam solution work progress managing unit 103 (Step S3).

Thus, if the cover is closed without performing the solution work for the recording sheet jam at all, it is assumed that the entire process for the work is too long and therefore the operator is embarrassed what work should be performed. Accordingly, repeatedly displaying the guidance video for the first process allows the operator to be clearly notified of the work should be started first.

When the jam solution work progress managing unit 103 determines that a plurality of processes for the jam solution work have not been completed yet ("Plural processes have not been performed yet" at Step S3), the display controller 102 causes the display 473 to display buttons to display the guidance videos showing the work procedure for these respective uncompleted processes in a list (Step S7).

Figure 6:
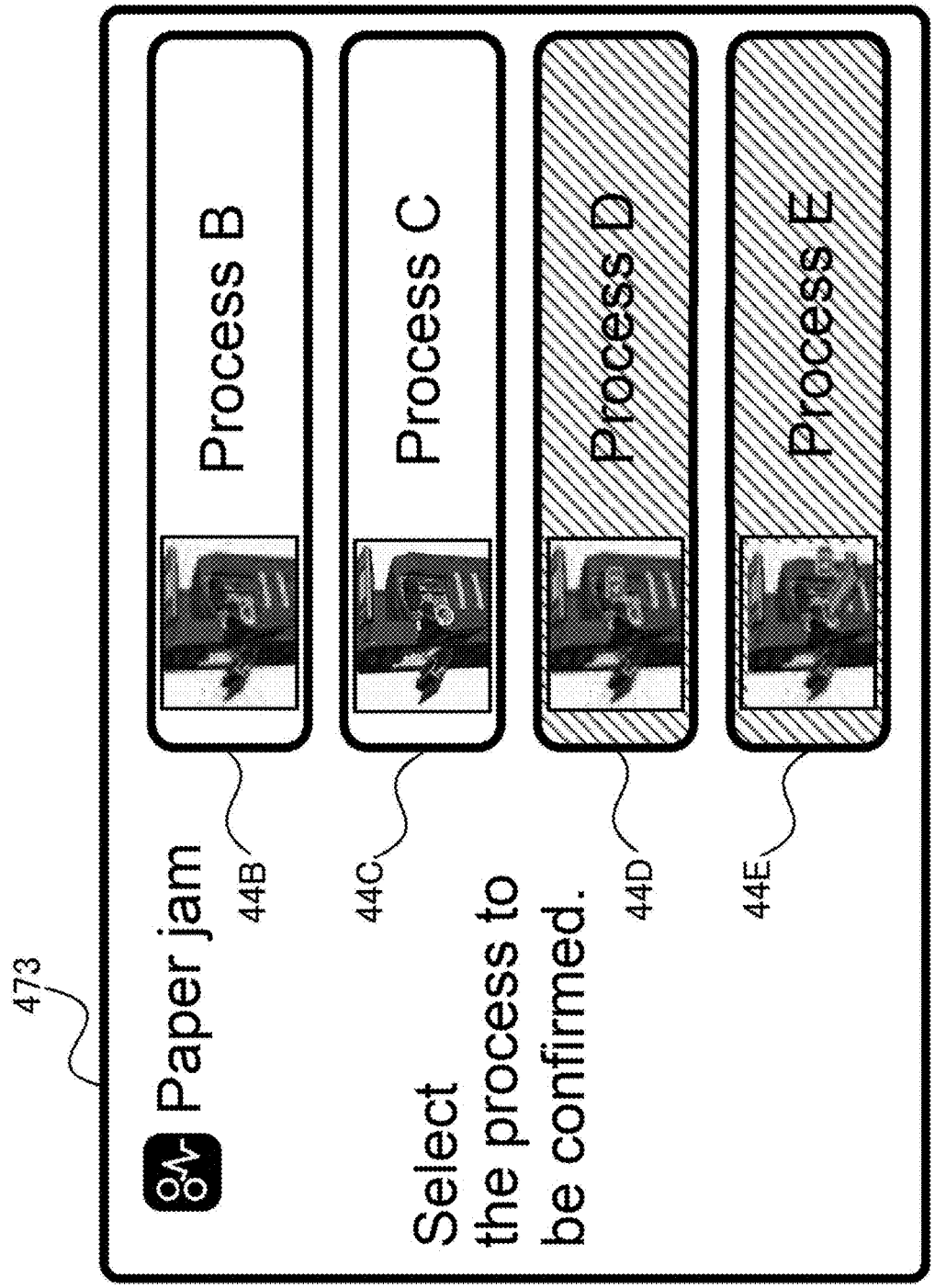
FIG. 6 illustrates a screen display example of selection buttons of the guidance videos for uncompleted processes.

FIG. 6 illustrates a screen display example of the selection buttons for the guidance videos for processes that have not been completed yet. For example, when the jam solution work progress managing unit 103 determines that only the process A has been completed and the process B to the process E have not been completed yet among the jam solution work constituted of the process A to the process E illustrated in FIG. 3, as illustrated in FIG. 6, the display controller 102 causes the display 473 to display buttons 44B, 44C, 44D, and 44E to display the guidance videos showing the work procedure of the uncompleted process B to process E in a list.

Here, the paper feeding unit is pulled out to the near side of the apparatus in the process D and the process E. In view of this, if the works for the process D and the process E have been performed with the processes up to the process C have not been completed, the recording sheet remaining at the proximity of the paper feeding unit possibly causes a so-called separation where the recording sheet is damaged due to the pulling of the paper feeding unit. Therefore, the display controller 102 disables the selection of the buttons to display the guidance videos showing the work procedure for the processes whose execution order should not be changed. This ensues preventing the operator from mistaking the process sequence and resulting in the separation.

Now returning to FIG. 5, the display controller 102 causes the guidance video corresponding to the button selected by the operator to be displayed (Step S8). The display controller 102 causes the display 473 to repeatedly display the guidance video corresponding to this selected button until the left cover 17 is once opened and thereafter the display controller 102 detects the closing of the left cover 17 based on the detection result by the cover sensor 93 (NO at Step S9). When the display controller 102 detects the closing of the left cover 17 (YES at Step S9), the process returns to Step S3 and the display controller 102 switches the display control of the guidance video according to the work progress determination by the jam solution work progress managing unit 103 (Step S3).

Thus, by allowing the operator to select the display of the guidance videos showing the work procedure for the uncompleted processes, the guidance videos required for the operator can be narrowed down and presented to the operator, thereby ensuring improving a convenience of the operator.

When the jam solution work progress managing unit 103 determines that only the last process for the jam solution work has not been completed yet ("Only last process has not been performed yet" at Step S3), the display controller 102 causes the display 473 to display the guidance video showing the work procedure for the last process in the solution work for the recording sheet jam (for example, the guidance video for the process E illustrated in FIG. 3) (Step S10). The display controller 102 causes the display 473 to repeatedly display this guidance video for the last process until the left cover 17 is once opened and thereafter the display controller 102 detects the closing of the left cover 17 based on the detection result by the cover sensor 93 (NO at Step S11). When the display controller 102 detects the closing of the left cover 17 (YES at Step S11), the process returns to Step S3 and the display controller 102 switches the display control of the guidance video according to the work progress determination by the jam solution work progress managing unit 103 (Step S3).

Thus, when only the last process has not been completed yet, by repeatedly displaying this guidance video showing the work procedure for the last process, the guidance video required for the operator can be narrowed down and presented to the operator, thereby ensuring improving the convenience of the operator.

Except for the above-described cases, when the jam solution work progress managing unit 103 determines that one or a plurality of processes in the jam solution work have not been completed yet at Step S3, the jam solution work progress managing unit 103 may notify the operator of the remain of the uncompleted processes as follows.

Figure 7:
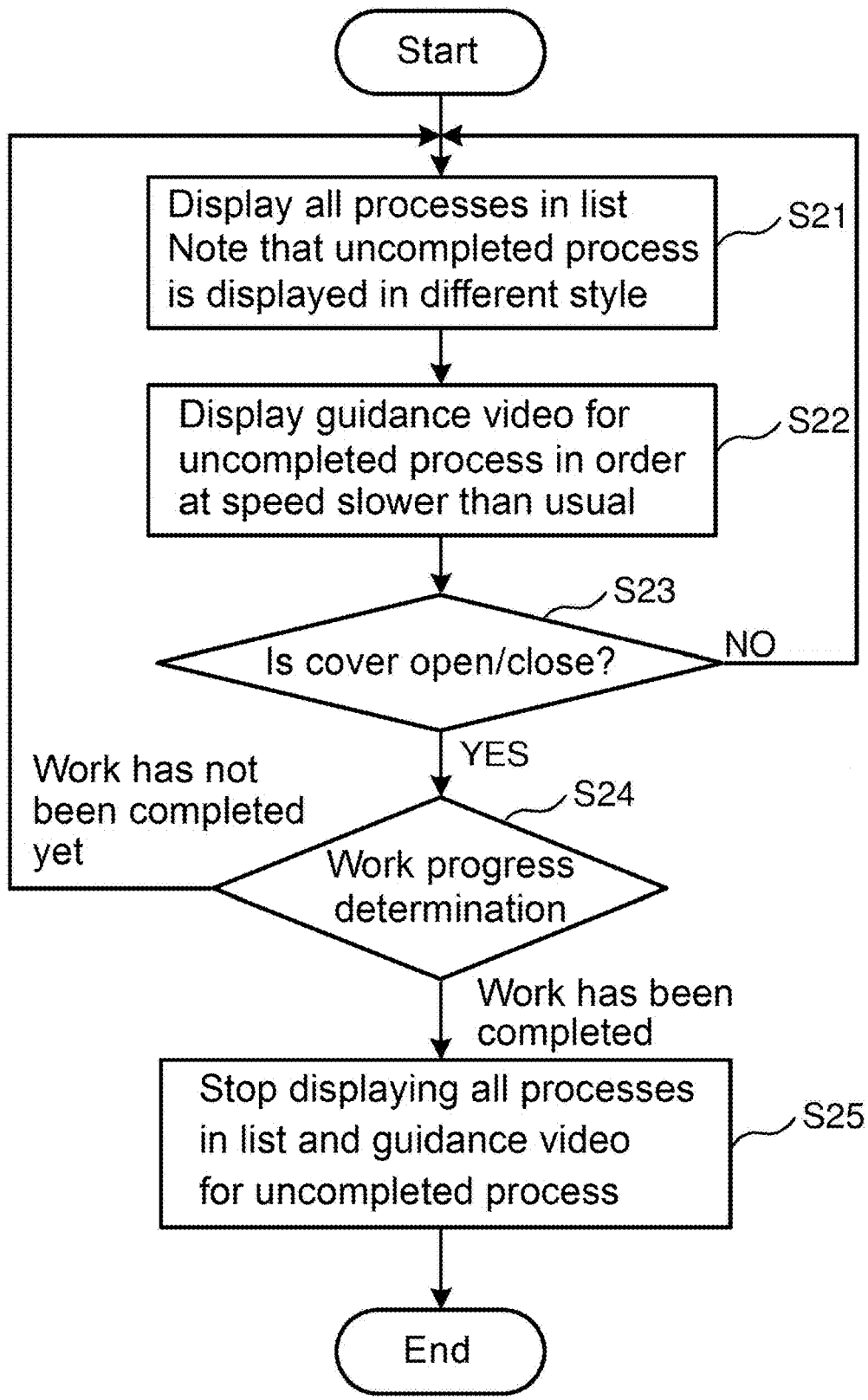
FIG. 7 illustrates the display process of the guidance video when the uncompleted process is present.

FIG. 7 illustrates the display process of the guidance video when the uncompleted process is present. When the jam solution work progress managing unit 103 determines that the one or the plurality of processes in the jam solution work have not been completed yet, the display controller 102 causes the display 473 to display all processes for the jam solution work in a list (Step S21). At this time, the uncompleted process is displayed in a display style different from other processes whose works have been completed.

Figure 8:
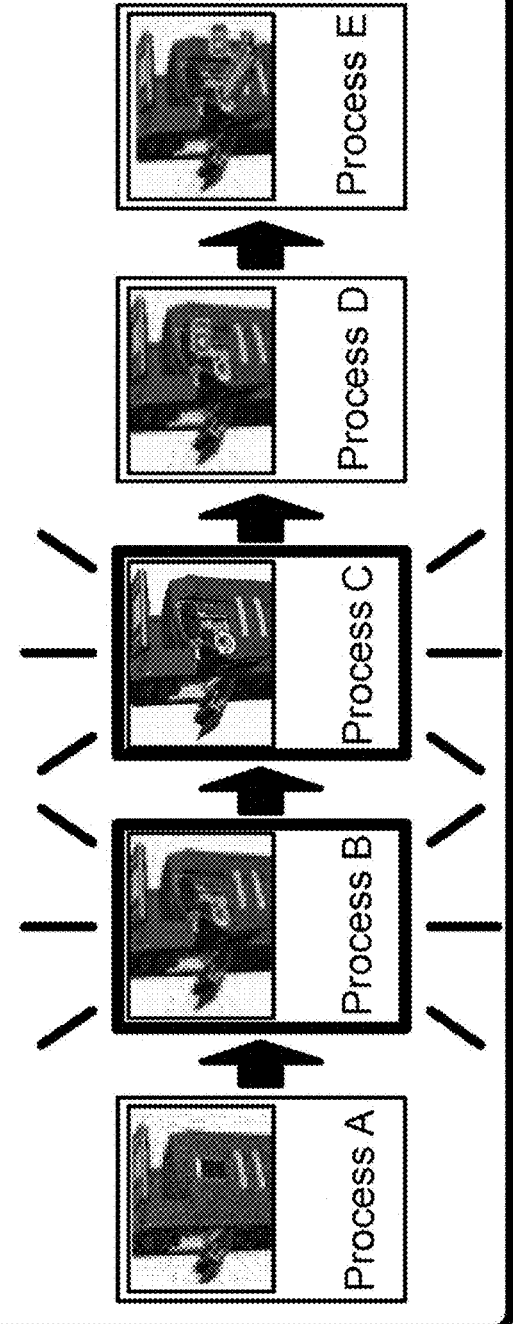
FIG. 8 illustrates a list display example of all processes of the solution work for the recording sheet jam.

FIG. 8 illustrates a list display example of all processes of the solution work for the recording sheet jam. For example, when the works of the process B and the process C have not been completed yet among the process A to the process E, the display controller 102 causes the display 473 to display a message indicative of the uncompleted state of the process B and the process C and causes the process B and the process C to flash in the list display of all processes. This allows the operator to clearly notify the processes that have not been completed yet. When the operator performs a touch operation on the uncompleted process displayed in flash in the display 473, the operation unit 47 accepts an instruction to display the guidance video showing this uncompleted process. According to the acceptance of this instruction, the display controller 102 causes the guidance video showing the work procedure for this process to be displayed.

Except for the flash, as the display style of the uncompleted process, the uncompleted process may be displayed enlarged compared with the other processes or the uncompleted process may be displayed brightly while the other processes whose works have been completed are displayed dark, in gray.

At Step S21, the display controller 102 may cause the display 473 to display the uncompleted process not in the display style different from the other processes whose works have been completed but in a display style similar to the other processes whose works have been completed. At Step S21, while the display controller 102 causes the display 473 to display all processes for the jam solution work in the list, the display 473 may display all processes in another format. For example, the display controller 102 may cause the display 473 to display the respective processes required for the jam solution work one by one in order in the display screen.

Returning to FIG. 7, subsequent to the list display of all processes as illustrated in FIG. 8, the display controller 102 causes the display 473 to display the guidance videos showing the work procedure for the uncompleted processes in the process sequence (Step S22). At this time, the display controller 102 causes the guidance videos showing the work procedures for the respective uncompleted processes to be displayed at a display speed slower than a display speed of the guidance videos showing the work procedures for the other processes. Alternatively, the display controller 102 may cause the display 473 to repeatedly display the guidance videos showing the work procedures for these respective uncompleted processes. This ensures the presentation of the work procedure for the uncompleted processes clear to the operator.

The display controller 102 displays all processes for the jam solution work in a list and repeatedly displays the guidance videos for the uncompleted processes until the left cover 17 is once opened and thereafter the display controller 102 detects the closing of the left cover 17 based on the detection result by the cover sensor 93 (NO at Step S23).

When the display controller 102 detects the closing of the left cover 17 (YES at Step S23), the display controller 102 switches the display control of the guidance video according to the work progress determination by the jam solution work progress managing unit 103 (Step S24). When the jam solution work progress managing unit 103 determines that all jam solution works have been completed ("Work completed" at Step S24), the display controller 102 stops displaying all processes for the jam solution work in the list and the guidance videos for the uncompleted processes (Step S25).

Meanwhile, when the jam solution work progress managing unit 103 determines that at least one process has not been completed in the jam solution work ("Work incomplete" at Step S24), the process returns to Step S21 and the display controller 102 causes the display 473 to display all processes for the jam solution work in a list.

As described above, according to this embodiment, when the display 473 displays the guidance video showing the solution work for the recording sheet jam during the recording sheet jam, the appropriate guidance video can be displayed according to the progress of the solution work for the recording sheet jam.

The disclosure is not limited to the configuration of the above-described embodiment, and various modifications are possible. For example, while the embodiment displays the guidance video in the display 473, instead of this, or in addition to this, the guidance video can be displayed in the personal computer 20 and an external device such as a tablet terminal. In this case, when the display of the guidance video is required as described above, the display controller 102 transmits the data of the guidance video and the display instruction to the external device via the network interface unit 92 to cause a display of this external device to display this guidance video.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An image forming apparatus comprising:
a display;
a display controller that causes the display to continuously display a guidance video in a process sequence when the recording sheet jam occurs, the guidance video showing a work procedure constituted of a plurality of processes for a solution work for a recording sheet jam;

a cover that is openable during the solution work for the recording sheet jam;

a cover sensor that detects an open/close state of the cover;

a recording sheet sensor located in a middle of a conveyance path for recording sheet, the recording sheet sensor detecting a conveyance situation of the recording sheet; and a jam solution work progress managing unit that manages a progress of the solution work for the recording sheet jam based on a detection result by the recording sheet sensor;

when the jam solution work progress managing unit determines that the solution work for the recording sheet jam is not performed while the cover sensor detects a closing of the cover, the display controller causes the display to repeatedly display a guidance video showing a work procedure for a first process in the solution work for the recording sheet jam, when the jam solution work progress managing unit determines that one or a plurality of processes for the solution work for the recording sheet jam has not been completed yet while the cover sensor detects the closing of the cover, the display controller further causes the display to display all processes for the solution work for the recording sheet jam in a list format, the display controller subsequently causing the display to repeatedly display guidance videos showing work procedures for the respective uncompleted processes in a process sequence, wherein the display controller further causes the display to display the guidance videos showing the work procedures for the respective uncompleted processes at a display speed slower than a display speed of guidance videos showing work procedures for other processes.

2. The image forming apparatus according to claim 1, further comprising a touch panel in the display; wherein when the jam solution work progress managing unit determines that a plurality of processes for the solution work for the recording sheet jam have not been completed yet while the cover sensor detects the closing of the cover, the display controller further causes the display to display buttons to display guidance videos showing work procedures for the respective uncompleted processes in a list and to display the guidance video showing a work procedure for process corresponding to the button where a selection is detected by the touch panel.

3. The image forming apparatus according to claim 2, wherein the display controller disables a selection of the button to display a guidance video showing a work procedure for a predetermined process whose execution order is unchangeable among the buttons displayed in the list in the display.

4. The image forming apparatus according to claim 1, wherein when the jam solution work progress managing unit determines that only a last process for the solution work for the recording sheet jam has not been completed yet while the cover sensor detects the closing of the cover, the display controller causes the display to repeatedly display the guidance video showing a work procedure for the last process.

5. The image forming apparatus according to claim 1, wherein when the jam solution work progress managing unit determines that one or a plurality of processes for the solution work for the recording sheet jam has not been completed yet while the cover sensor detects the closing of the cover, the display controller further causes the display to display all processes for the solution work for the recording sheet jam in a list format, the respective uncompleted processes being shown in a display style different from other processes where works have been completed, the display controller subsequently causing the display to repeatedly display guidance videos showing work procedures for the respective uncompleted processes in a process sequence.

6. The image forming apparatus according to claim 1, wherein when the jam solution work progress managing unit determines that one or a plurality of processes for the solution work for the recording sheet jam has not been completed yet while the cover sensor detects the closing of the cover, the display controller further causes the display to display the respective uncompleted processes in a display style different from other processes where works have been completed, the display controller subsequently causing the display to repeatedly display guidance videos showing work procedures for the respective uncompleted processes in a process sequence.

7. The image forming apparatus according to claim 1, further comprising an operation unit that accepts an instruction from an operator; wherein the display controller causes the display to display the guidance videos showing the work procedures for the uncompleted processes when the operation unit accepts an instruction to display the guidance videos for the uncompleted processes displayed in a different display form in the display.

8. The image forming apparatus according to claim 1, wherein the display controller causes the display to repeatedly display the guidance videos showing the work procedures for the respective uncompleted processes.

* * * * *